Nov. 4, 1958

J. H. AUER, JR., ET AL 2,859,434

SPEED MEASURING APPARATUS FOR RAILROAD
CLASSIFICATION YARDS

Filed Nov. 8, 1955

INVENTORS
J.H. AUER JR. AND
H.C. KENDALL

BY Forest B. Hitchcock

THEIR ATTORNEY

INVENTORS
J. H. AUER JR. AND
H. C. KENDALL
BY Forest B. Hitchcock
THEIR ATTORNEY

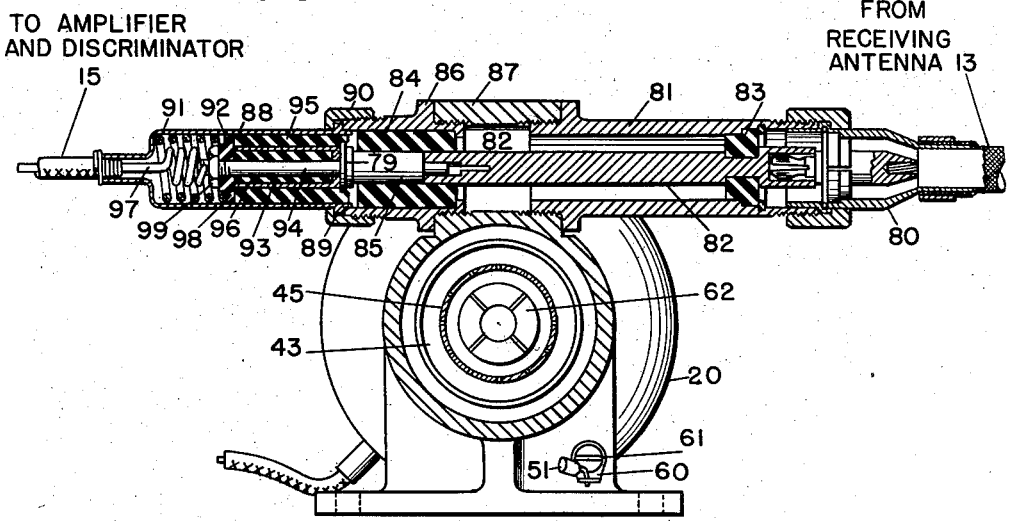
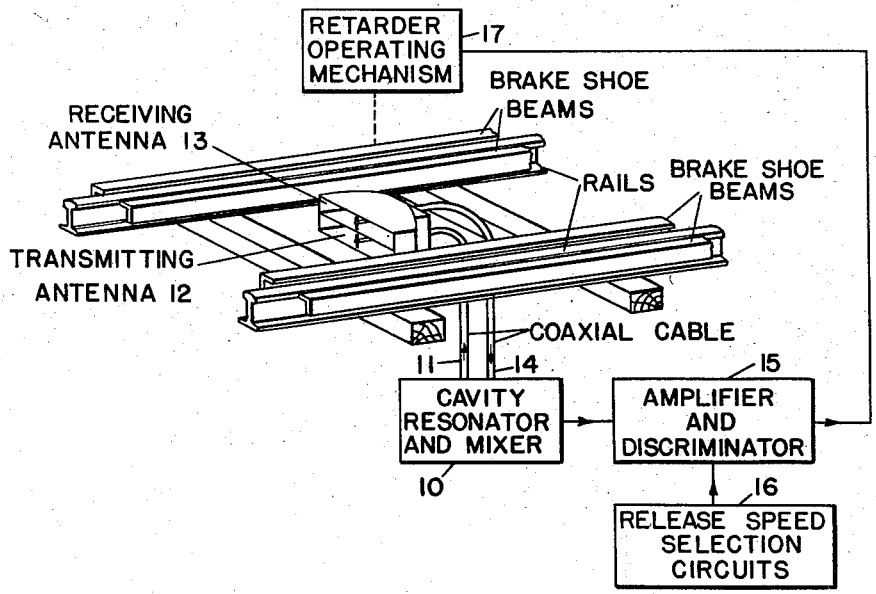

United States Patent Office

2,859,434
Patented Nov. 4, 1958

2,859,434

SPEED MEASURING APPARATUS FOR RAILROAD CLASSIFICATION YARDS

John H. Auer, Jr., and Hugh C. Kendall, Rochester, N. Y., assignors to General Railway Signal Company, Rochester, N. Y.

Application November 8, 1955, Serial No. 545,705

2 Claims. (Cl. 343—8)

This invention relates to automatic retarder control systems for railroad classification yards and more particularly pertains to an improved cavity resonator and mixer for use in a Doppler frequency shift speed measuring system.

In railroad car classification yards, the cars of a train are classified into different categories by allowing them to roll by gravity down an incline and over a number of route-selecting switches to a particular one of a plurality of destination tracks. Car speeds are regulated by providing car retarders along the way which comprise trackway brake beams that can be controlled to grip the wheels of a car and decelerate it as required. Apparatus is associated with each retarder to cause its release when the car in the retarder has had its speed reduced to a desired value which is selected in accordance with car weight, rollability, route, and other factors. It is desirable, in such a system, that speed measuring means be provided for each retarder to continuously provide an output indicative of the speed of each car so that the retarder can be released at the moment when the car speed has been reduced to the proper value.

In one speed measuring system of this kind, commonly known as a Doppler frequency-shift speed measuring system, a high frequency, continuous-wave signal is generated and transmitted from a directional antenna toward the moving cars. A portion of this signal is reflected back from the surface of the car to a receiving antenna with shift of frequency of the signal, with the amount of this shift being proportional to the speed of the vehicle. The portion of the reflected signal that is intercepted by the receiving antenna is mixed with a portion of the originally generated signal. A beat frequency signal results whose frequency equals the difference in frequency between the transmitted and reflected signals, and the value of this frequency then provides a measurement of vehicle speed. Our prior-filed application U. S. Ser. No. 375,192 dated August 19, 1953, now Patent Number 2,805,335, discloses means including a cavity resonator and associated transmitting and receiving antennas particularly adapted for use in such a system. The overall system whereby automatic control of the retarders is accomplished through electronic apparatus that is responsive to measured car speed and to various factors affecting the desired release speed of a car, is disclosed in our prior application U. S. Ser. No. 359,162 filed June 2, 1953.

The cavity resonator and mixer of this invention is considered to be in the nature of an improvement over that disclosed in the above-mentioned application Ser. No. 375,192. Both the function of generating the high frequency signal to be transmitted and also the function of mixing a portion of this signal with the reflected signal is accomplished in an integrated organization in preference to providing two separate devices for these functions. Also, the cavity resonator structure has been devised so as to provide an improved means of making connections to the associated electron tube. Another advantage lies in the particular enclosed structure employed which prevents the leakage of high frequency energy to the space outside the resonator structure and thus prevents the disturbing influence of standing waves in the immediate vicinity of the cavity.

A feature of this invention thus resides in the organization of an integrated re-entrant type of cavity resonator and an associated mixer adapted particularly for use in a Doppler frequency-shift type of speed measuring system.

Another feature of this invention is to provide a cavity resonator having improved mean for making electrical connections to the various elements of an associated electron tube, particularly the means for connecting to the plate cap of a tube.

Still another feature of this invention is to provide a resonator having a totally enclosed but removable end portion to prevent the undesired leakage of high frequency energy and yet permit access to the interior of the cavity for the making of required adjustments.

Other objects, purposes, and characteristic features of this invention will in part be obvious from the accompanying drawings and in part pointed out as the description of the invention progresses. In describing the detailed features of this invention, reference will be made to the accompanying drawings disclosing one embodiment of this invention. In these drawings:

Fig. 5 is a cross-sectional view taken through the line 5—5 of Fig. 1 to show particularly the mixer organization including the crystal rectifier; and Fig. 6 is a simplified block diagram showing particularly the manner in which the resonator and mixer may be used in a speed measuring system for a railway classification yard.

Figure 1:
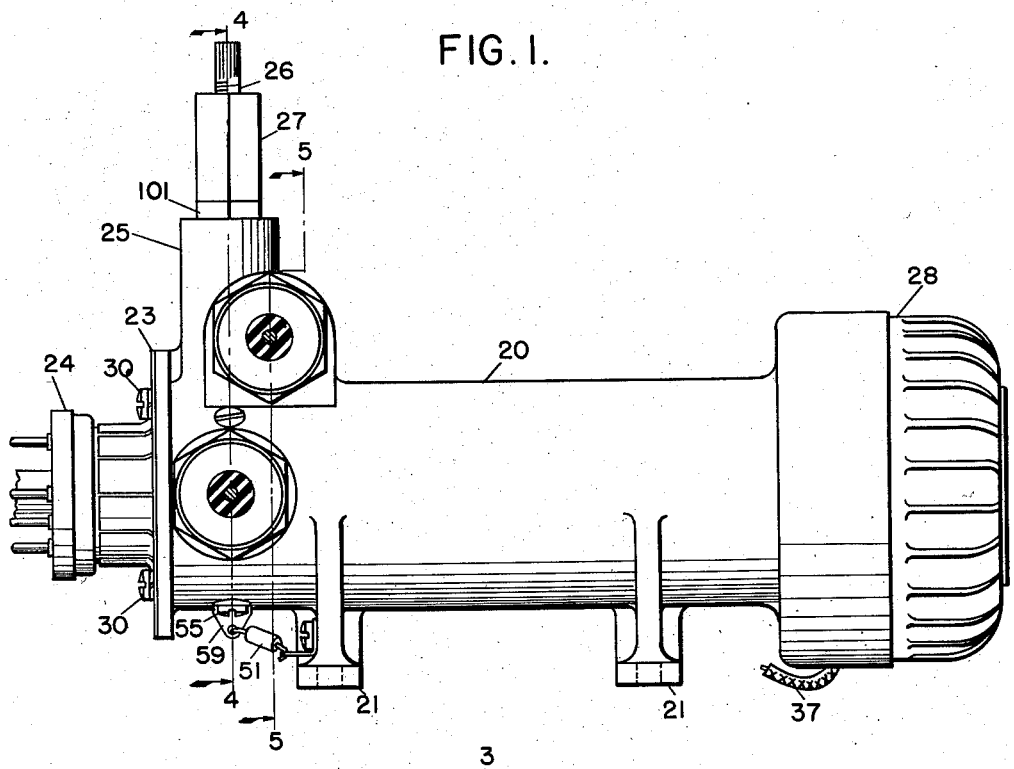
Fig. 1 illustrates a side view of the exterior of the resonator and mixer of this invention.

Fig. 6 illustrates diagrammatically how the cavity resonator and mixer of this invention may be used in an automatic retarder control system. The high-frequency energy generated in the cavity resonator and mixer 10 is applied through the coaxial cable 11 to a transmitting antenna 12. Both the transmitting antenna 12 and receiving antenna 13 are combined in a single housing. The high-frequency energy radiating from the transmitting antenna toward moving vehicles is partially reflected, and a portion of the reflected energy is intercepted by the receiving antenna 13 and applied over coaxial cable 14 to the mixer included in the cavity resonator and mixer 10. The resulting output signal that is then applied to the amplifier and discriminator 15 comprises an audio frequency signal having its frequency proportional to the speed of the vehicle.

The amplifier and discriminator 15 includes electromagnetic relays that are selectively actuated when the car speed, as measured by the frequency of the beat frequency signal, is at the proper value for release of the retarder as determined by the release speed selecting circuits 16. The release speed selecting circuits 16 encompass the various means affected by car weight, rollability, route, and various other factors that determine the proper release speed of a car. The actuation of the relays included in the amplifier and discriminator 15 acts upon the retarder operating mechanism 17 to release the braking effect of the car retarder with the result that the car is then released from the retarder at the desired speed.

The theory of operation of the re-entrant cavity resonator of this invention will not be described in detail. A resonator of this general type with its associated tube is shown in Fig. 7.1 on page 173 of the book "Klystrons and Micro-Wave Triodes" which comprises volume 7 of the Radiation Laboratory series, published by the McGraw-Hill Company.

Figure 2:
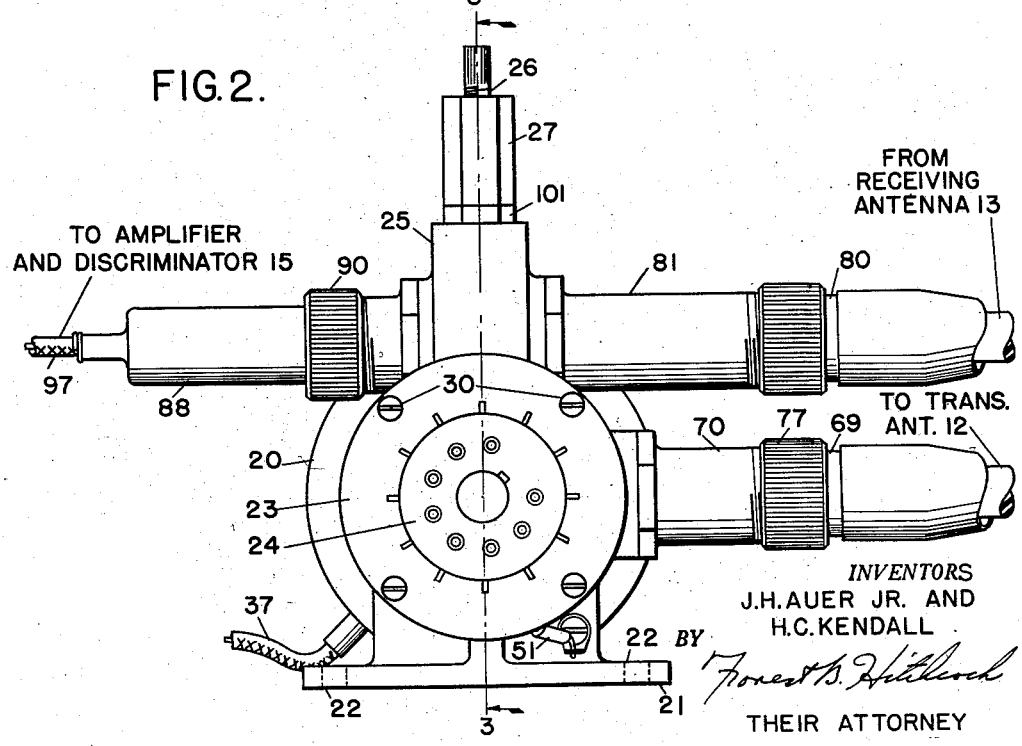
Fig. 2 shows an end view of the same structure shown in Fig. 1.

Fig. 1 illustrates a side elevational view of the cavity resonator and mixer, while Fig. 2 shows a left elevational view. The device comprises generally an outer shell 20 having two extending base portions 21, both of which are provided with holes as indicated at 22 to permit the mounting of the casting to a suitable plate. A collar 23 encloses the open left-hand portion of the outer-shell 20, and this collar is provided with multiple slots along the axis of the cavity to provide spring pressure as an aid in holding in place an electron tube 24. The cap 23 is fastened to shell 20 by means of screws 30. A protruding boss 25 is provided for the injection probe 26 whose knurled end portion extends above the locking nut 27. An end cap 28 is provided which threads into the casting 20 and fully encloses the right hand end of the cavity as is better shown in the sectional view of Fig. 3.

Figure 3:
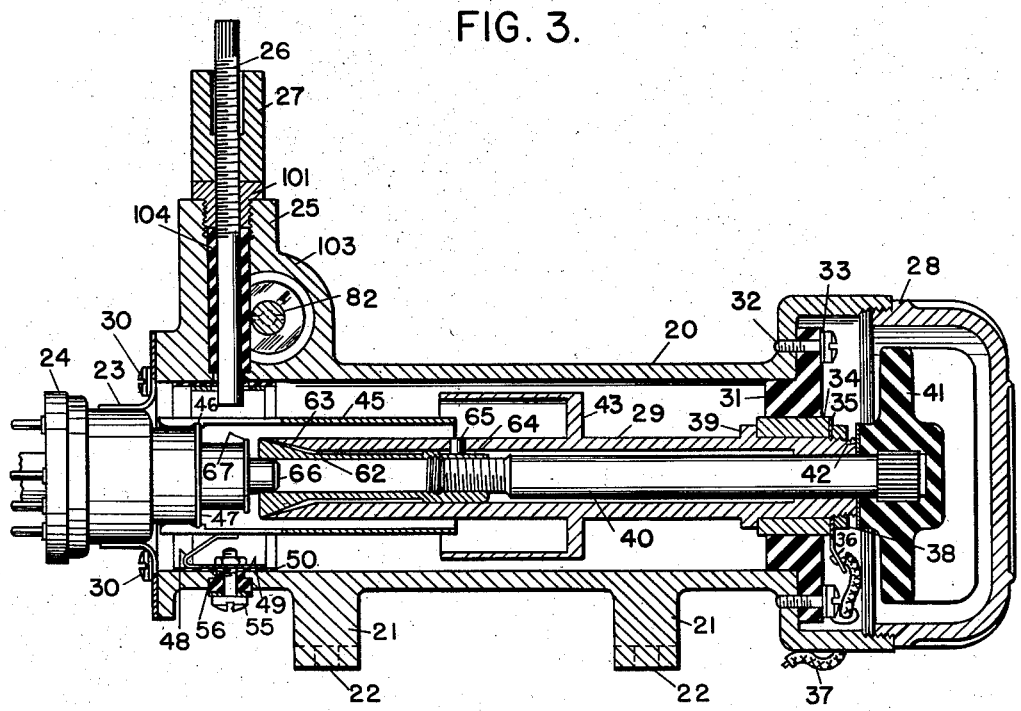
Fig. 3 illustrates a cross-sectional view taken through the line 3—3 of Fig. 2.

Fig. 3 illustrates how the plate rod 29 is held in place within the outer shell 20. A circular disc 31 formed of an electrical insulating material is fastened to the shell 20 by means of the screws 32, each having an associated washer 33, with the screws fitting into tapped holes in the shell 20. This insulating disc 31 supports the metal bushing 34 which is molded into disc 31. The plate rod has a circumferential shoulder 39 that abuts the left-hand edge of bushing 34. A metal washer 35 fits over the plate rod 29 adjacent the right-hand edge of bushing 34. The washer 35 has a projecting tab 36 to permit direct voltage to be applied to the plate rod 29 over the wire 37. The nut 38 screws onto the threaded end of the plate rod and draws the shoulder 39 tightly against bushing 34.

The plate choke 43 comprises a hollow cylinder open at its left-hand end but joined at its opposite end with the plate rod 29 with which it is an integral part. The length of this plate choke is approximately ¼ wave length of the frequency employed so that it presents a very high impedance to the radio frequency field within the cavity at its open left-hand end and thereby terminates this field at that point.

Within the hollow, center portion of the plate rod 29 is a solid collet tightening rod 40 which is used to actuate a collet chuck as will later be described. The right-hand end of this rod 40 is splined and has molded to it a circular collet adjusting wheel 41 formed of an electrical insulating material to permit rotation of the rod 40. Access to the collet adjusting wheel 41 is gained by removing the end cap 28. A thrust washer 42 is interposed between the plate rod 29 and the adjusting wheel 41.

As previously described, the electron tube 24 is held in place at the left-hand end of the cavity by the slotted, spring-like collar 23. The grid cylinder 45 is slipped over the end of the tube before it is installed in the cavity. This grid cylinder is provided with a number of slots at its left-hand end and is also formed to have a circumferential groove 46 on its inner surface. As a result, the grid cylinder is held tightly in place when it is slipped over the end of the tube with the projecting rim 47 fitting tightly into the groove 46.

The grid cylinder is further supported within the cavity by means of three spring supports 48 which are equally spaced about the inner circumference of the shell 20. The spring supports 48 all are formed of projecting tabs on a metallic circular ring 49 which is more clearly shown in Fig. 4. A strip of insulating material 50 having a high dielectric constant is formed into a ring and placed between the circular ring 49 and the outer shell 20 to form a by-pass capacitor. Both the circular ring 49 and the strip of insulating material 50 have a hole in the appropriate place to permit the insertion of the probe 26.

It has been found desirable to so organize the cavity structure that connections are made at points of low radio-frequency voltages. Thus, the spring supports 48 make contact with the grid cylinder 45 at points along its axial length where the voltage is a minimum, i. e. at a voltage node. In addition, the spring supports 48, by being effectively grounded to radio frequencies at their point of fastening to the outer shell 20, tend to present a rather high impedance to these frequencies at their point of contact with grid cylinder 45. This high impedance results even though the spring supports have a length somewhat less than a quarter wave length of the operating frequency.

The circular ring 49 is fastened to the inner surface of the shell 20 at each point where one of the projecting tabs is located. The fastening means comprises a screw such as the screw 55 which passes through a bushing 56 formed of an electrical insulating material and through a corresponding hole in both the strip of insulating material 50 and in the circular ring 49. This screw 55 is held in place by a washer 57 and a nut 58.

A soldering terminal 59 is fastened under the head of the screw 55 to permit a resistor 51 to be connected from this point to another soldering terminal 60 that is held to the base of the shell 20 by means of screw 61. This resistor 51 provides a direct-current connection from the grid cylinder to ground for the purpose of permitting a bias voltage to be developed as a result of the flow of grid current through this resistor. High frequency current is kept within the cavity 20 by means of the by-pass capacitor comprising ring 49, insulating ring 50, and shell 20 in the manner previously described.

A collet chuck is provided to secure the plate rod 29 to the plate connection 66 of tube 24. The jaws of this chuck comprise four quarter segments formed by cutting longitudinal slots in the member 62 for a portion of its length. These slots are more clearly shown in the end view of Fig. 4. The jaws are also broached to form axial grooves on the inner surface, thereby, providing a greater number of points of contact between the jaws of the chuck and plate connection of tube 24. The member 62 fits inside the hollow portion of the plate rod 29 and is provided with a threaded end portion to permit the threaded end of collet tightening rod 40 to be screwed into this end portion. The upper surface of member 62 is machined to have a flat upper surface at 64, and a pin 65, passing through the plate rod 29, presses tightly against this flat upper surface 64 and thereby prevents rotation of the member 62 with respect to the plate rod 29. The left-hand end of the inner surface of plate rod 29 is provided with a bevelled surface 63 to thereby provide what is actually an inclined plane against which bears the left-hand end of the outer surface of the segments 62. When the collet adjusting wheel 41 is turned in a clockwise direction, thereby rotating rod 40, member 62 is drawn to the right. The outer-most tip of each segment then progresses up the inclined surface 63 and is thereby pressed inwardly so as to grip the protruding plate connection 66 of tube 24. This means of connecting to the plate of tube 24 not only provides a strong mechanical but also an excellent electrical connection and furthermore facilitates in the tuning of the cavity resonator.

It has been found that the frequency of operation of the resonator is appreciably affected by the distance extending from the tip of the collet where it grasps the plate connection 66 to the ring 67 at the base of the plate connection. When it is necessary to tune the resonator to some desired frequency, it is then only necessary to remove the end cap 28, loosen the collet by turning the wheel 41 in a counterclockwise direction, and then move the entire tube 24 in or out with respect to the collet. When the desired frequency of operation is obtained, the collet is again tightened by turning the wheel in a clockwise direction, after which the end cap 28 is replaced.

Figure 4:
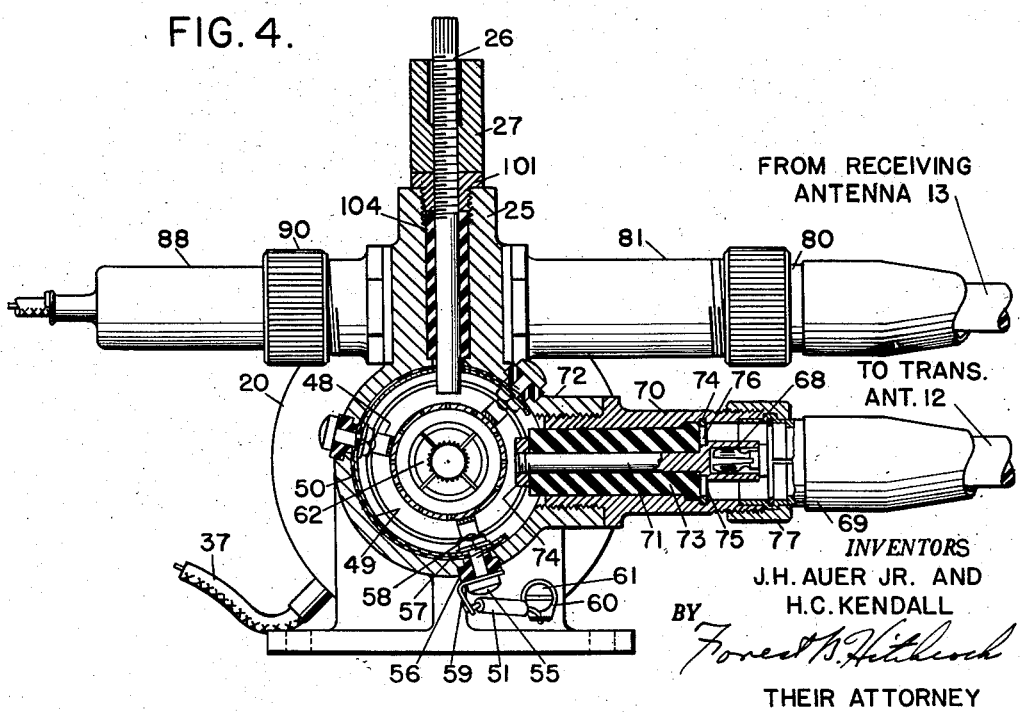
Fig. 4 is a sectional view taken through the line 4—4 of Fig. 1 so as to show particularly the injection probe and the means in which the energy is coupled from the cavity to the transmitting antenna.

The electrical energy generated within the cavity is coupled to the transmitting antenna over a coaxial line 69 shown in Fig. 4. The protruding cylindrical member 70 and the inner concentric rod 71 form a portion of this coaxial line within the cavity itself. The boss 72 has a threaded inner surface to permit it to receive the cylindrical member 70. A bushing 73 made of an electrical insulating material fits into the member 70 and has a hollow core to permit it to receive the contact member 71. The member 71 is threaded at its left-hand end so that it can be fitted with a threaded button 74. At its right-hand end, the member 71 is of increased diameter and has a hollow center portion which adapts it to receive the tip 68 of a male coaxial connector having a sleeve 77 that screws onto the threaded end of member 70. This coaxial connecting means is more fully shown in Fig. 5. It will not be described in detail, however, since it does not form a part of this invention. A groove is formed in the inner surface of the cylinder 70 as indicated by the reference character 74. A split ring washer 75 encircles the contact member 71 and fits into the groove 74 to thereby hold the insulating bushing 73 in place. A groove 76 is also cut in the outer surface of the member 71 for the purpose of maintaining a constant ratio of diameters between the inner and outer surfaces forming the coaxial line. The contact member 71 and the associated encircling cylinder 70 thus provide a coaxial line that permits the coupling of the high frequency energy within the cavity to an external coaxial cable 69 for supplying energy to the transmitting antenna.

The reflected energy that is received by the receiving antenna is supplied over a coaxial cable 80 to a similar coaxial line comprising the external cylinder 81 and associated inner contact member 82 shown in Fig. 5. The contact member 82 is supported at its right-hand end by a bushing 83 made of an insulating material. A similar insulating bushing 84 supports the member 82 at its left-hand end. An opening is provided at the left-hand end of the member 82 to permit it to receive the projecting end portion of a crystal rectifier 85. The insulating bushing 84 fits within an outer cylinder 86 that screws into the boss 87 of the cavity shell 20. This outer cylinder has an inwardly projecting rim at its right-hand end, and the right-hand end of bushing 84 abuts against this rim.

The tube 88 fits within the cylindrical member 86 but has a projecting rim 89 that abuts the end surface of the cylindrical member 86. A sleeve 90 screws onto the threaded outer surface of the member 86, thereby holding the tube 88 tightly in position with respect to member 86.

Within the tube 88 is a choke member comprising an outer hollow cylinder 93 surrounding a solid inner rod 94. The rod 94 has at its right-hand end and integral therewith a circular head portion 79, and this has soldered to it the outer cylinder 93. Thus, the inner and outer conductors of the choke are short-circuited together at the end where they are in contact with the crystal rectifier 85.

Fitting within the tube 88 and around the hollow cylinder 93 is an insulating bushing 95. A similar insulating bushing 96 surrounds the inner rod 94. An insulating washer 98 insulates the nut 99, which screws onto the threaded end of rod 94 and holds the various components of the choke in place, from the outer cylinder 93. A coiled spring 91 bears against the insulating washer 98 to hold the choke assembly in place. Thus, the rod 94 and encircling cylinder 93 which are shorted together at their right-hand ends are insulated from each other at their left-hand end. Since their length is made equal to about one-quarter of the wavelength of the frequency used, the choke presents a short circuit to this frequency at its end adjacent the crystal rectifier 85. Consequently, the signal resulting from the mixing of the two differing frequencies is rectified by the crystal rectifier 85 and then the radio frequency currents are effectively filtered out as a result of the low impedance to radio frequencies presented by the shorted choke. As a result, substantially only the audio frequency difference frequency is present at the left-hand end of this choke, and it is this signal which is then applied over the connecting wire 97 to the amplifier and discriminator.

The injection probe which permits the coupling of a portion of the originally generated high frequency signal to the crystal rectifier is best shown in Figs. 3 and 4. The probe itself is in the form of a cylindrical rod 26 which is knurled at its upper end so as to permit its threaded portion to be moved into or out of the mating threaded bushing 101. When the proper depth of insertion of the rod into the cavity has been obtained, the probe 26 is locked in place by tightening the nut 27. The probe is insulated from the projecting boss 103 over most of its length by means of the insulating bushing 104. At its upper end, however, the probe threads into the metallic bushing 101 which, in turn, is threaded into the boss 103. Thus the probe is effectively shunted to the outer grounded shell 20. This outer boss and the concentric inner probe thus form a coaxial line to permit the coupling of energy from the interior of the cavity. The length of this coaxial line is preferably selected so that it will produce the least reactive loading at its lower end upon the cavity itself. This ensures that the probe will have a minimum effect in changing the operating frequency of the cavity.

As is clearly shown in Fig. 3, the probe 26 and the member 82 (see Fig. 5) pass in close proximity to each other although they are transverse to each other. This position readily permits the coupling of a portion of the energy on the probe 26 to the member 82 to make it possible for a portion of the originally generated signal to be received by the crystal mixer 85 along with the reflected signal that is picked up by the receiving antenna.

Having described an improved cavity resonator and mixer for use in the speed measuring system as one embodiment of this invention, we desire it to be understood that various other modifications, adaptations, and alterations may be made to this specific form shown to meet the requirements of practice without in any manner departing from the spirit or scope of this invention.

What we claim is:

1. In a cavity resonator for generating high frequency oscillations, a cylindrical shell, an electron tube having a plate connection protruding into said shell from one end thereof, a plate rod extending into said shell from the opposite end thereof, means associated with said plate rod comprising a rotatable rod extending into said shell from said opposite end for securely gripping said protruding plate connection, means fastened to the end of said rotatable rod at said opposite end to facilitate rotation of said rotatable rod, and a metallic end cap adapted to screw into said opposite end of said shell to completely enclose said shell and thereby restrict said oscillations to the space within said shell.

2. In a cavity resonator for use in a Doppler type speed measuring system, a cylindrical shell, an electron tube for generating high frequency oscillations in said shell, means for transmitting said oscillations towards moving vehicles and for receiving a portion of the signal reflected from said vehicles, an injection probe comprising a rod perpendicular to the axis of said shell and being axially adjustable to permit variation of its insertion into said shell, a mixer comprising a coaxial line lying transverse to and in close proximity to said injection probe and having said reflected signal applied thereto, a crystal rectifier connected in series with the inner conductor of said coaxial line and having the alternating current frequency appearing on said coaxial line applied to its one terminal, a choke contacting the other end of said crystal rectifier and comprising an inner rod and encircling cylinder connected together at the end contacting said rectifier, said choke being in length approximately equal to one quarter of the wave length of said frequency to thereby provide a low impedance to the rectified high frequency signals appearing at said opposite end of said rectifier, whereby an audio signal having its frequency proportional to the speed of said vehicles is provided at the opposite end of said choke.

References Cited in the file of this patent

UNITED STATES PATENTS

| | | |
|---|---|---|
| 2,425,352 | Sloss | Apr. 12, 1947 |
| 2,436,700 | Spielman | Feb. 24, 1948 |
| 2,462,866 | Hotine | Mar. 1, 1949 |
| 2,561,727 | Cooper | July 24, 1951 |
| 2,605,421 | Schultz | July 29, 1952 |
| 2,627,577 | Barton | Feb. 3, 1953 |
| 2,644,929 | Kumpf | July 7, 1953 |